(12) United States Patent
Cengil et al.

(10) Patent No.: US 10,489,020 B2
(45) Date of Patent: Nov. 26, 2019

(54) METHOD AND SYSTEM FOR SELECTING AN OPERATION MODE FOR A VEHICLE

(71) Applicant: VOLKSWAGEN AKTIENGESELLSCHAFT, Wolfsburg (DE)

(72) Inventors: Sükrü Cengil, Burgwedel (DE); Jan Peter Herdey, Braunschweig (DE); Oliver Wolf, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 15/633,829

(22) Filed: Jun. 27, 2017

(65) Prior Publication Data
US 2017/0371507 A1    Dec. 28, 2017

(30) Foreign Application Priority Data

Jun. 27, 2016   (EP) .................................... 16176409

(51) Int. Cl.
| | |
|---|---|
| *B60W 30/182* | (2012.01) |
| *G06F 3/0482* | (2013.01) |
| *B60W 50/08* | (2012.01) |
| *G09G 5/377* | (2006.01) |
| *G06F 3/0484* | (2013.01) |

(52) U.S. Cl.
CPC ......... *G06F 3/0482* (2013.01); *B60W 30/182* (2013.01); *B60W 50/082* (2013.01); *G09G 5/377* (2013.01); *G06F 3/0484* (2013.01); *G09G 2340/12* (2013.01); *G09G 2354/00* (2013.01); *G09G 2380/10* (2013.01)

(58) Field of Classification Search
CPC combination set(s) only.
See application file for complete search history.

(56) References Cited

U.S. PATENT DOCUMENTS

| 9,649,974 B1 * | 5/2017 | Arumugasamy | ...... B60Q 1/143 |
|---|---|---|---|
| 9,975,427 B2 * | 5/2018 | Hisatsugu | .............. B60K 35/00 |
| (Continued) | | | |

FOREIGN PATENT DOCUMENTS

| DE | 10033770 A1 | 1/2002 |
|---|---|---|
| DE | 102006022692 A1 | 11/2007 |
| (Continued) | | |

OTHER PUBLICATIONS

Dodge Challenger Owner's Manual; Chrysler Group LLC; 2014.

*Primary Examiner* — Hien L Duong
(74) *Attorney, Agent, or Firm* — Barnes & Thornburg LLP

(57) ABSTRACT

A method for selecting an operating mode for a vehicle which has at least two operating modes. Graphics data of a graphic user interface are generated and output, wherein the graphic user interface includes a background display and at least two selectable control buttons, wherein the control buttons are each assigned to an operating mode of the vehicle. A selection of a control button is detected, and a control signal is generated and transmitted to a control device of the vehicle as a function of the operating mode assigned to the selected control button. The background display includes a display of a vehicle surface, wherein the displayed vehicle surface is formed as a function of the operating mode which is selected at the current time. Also disclosed is a system for selecting an operating mode for a vehicle.

20 Claims, 6 Drawing Sheets

(56) References Cited

U.S. PATENT DOCUMENTS

| | | | | |
|---|---|---|---|---|
| 2002/0080148 A1* | 6/2002 | Uchino | G06T 15/50 | 345/629 |
| 2009/0085880 A1* | 4/2009 | Vitale | B60R 11/0264 | 345/173 |
| 2010/0042926 A1* | 2/2010 | Bull | G06F 1/1632 | 715/732 |
| 2011/0010433 A1* | 1/2011 | Wilburn | G06Q 30/02 | 709/219 |
| 2011/0307130 A1* | 12/2011 | Gow | B60G 17/0195 | 701/22 |
| 2012/0320213 A1* | 12/2012 | Ikeda | B60R 1/00 | 348/148 |
| 2013/0239001 A1* | 9/2013 | Maloney | G06F 17/211 | 715/732 |
| 2013/0321616 A1* | 12/2013 | Lee | B62D 15/0275 | 348/118 |
| 2013/0339892 A1* | 12/2013 | Watanabe | G01M 17/0072 | 715/771 |
| 2014/0040712 A1* | 2/2014 | Chang | G06F 17/212 | 715/202 |
| 2014/0210608 A1* | 7/2014 | Yamada | G07C 5/00 | 340/459 |
| 2014/0218507 A1* | 8/2014 | Watanabe | B60K 35/00 | 348/116 |
| 2014/0233805 A1* | 8/2014 | Faber | G01W 1/00 | 382/104 |
| 2014/0331153 A1* | 11/2014 | Park | G06F 3/0488 | 715/763 |
| 2015/0149891 A1* | 5/2015 | Magistrado | G06F 17/2247 | 715/235 |
| 2015/0234580 A1* | 8/2015 | Secord | G06F 3/04847 | 715/771 |
| 2015/0274016 A1* | 10/2015 | Kinoshita | G06F 3/04842 | 701/36 |
| 2015/0274176 A1* | 10/2015 | Mino | B60W 50/08 | 701/36 |
| 2016/0034152 A1* | 2/2016 | Wilson | G06F 3/04845 | 715/835 |
| 2016/0048283 A1* | 2/2016 | Yang | G06F 3/0488 | 715/784 |
| 2016/0150070 A1* | 5/2016 | Goren | H04W 4/029 | 455/404.2 |
| 2017/0061669 A1* | 3/2017 | Hirano | G06T 13/80 | |
| 2018/0192005 A1* | 7/2018 | Watanabe | B60R 1/00 | |

FOREIGN PATENT DOCUMENTS

| | | |
|---|---|---|
| DE | 102014019157 A1 | 6/2016 |
| EP | 2945046 A1 | 11/2015 |
| JP | 2014144771 A | 8/2014 |
| WO | 2013087777 A1 | 6/2013 |

\* cited by examiner

METHOD AND SYSTEM FOR SELECTING AN OPERATION MODE FOR A VEHICLE

PRIORITY CLAIM

This patent application claims priority to European Patent Application No. 16176409.7, filed 27 Jun. 2016, the disclosure of which is incorporated herein by reference in its entirety.

SUMMARY

Illustrative embodiments relate to a method for selecting an operating mode for a vehicle which has at least two operating modes. In the disclosed method, graphics data of a graphic user interface are generated and output, wherein the graphic user interface comprises a background display and at least two selectable control buttons, wherein the control buttons are each assigned to an operating mode of the vehicle. A selection of a control button is detected, and a control signal is generated and transmitted to a control device of the vehicle as a function of the operating mode which is assigned to the selected control button.

Illustrative embodiments also relate to a system for selecting an operating mode for a vehicle, which system has at least two operating modes. The system comprises a computing unit by means of which graphics data of a graphic user interface can be generated, and an output unit by means of which the graphics data can be output. In this context, the graphic user interface comprises a background display and at least two selectable control buttons, wherein the control buttons are each assigned to an operating mode of the vehicle. The system also comprises a detection unit by means of which a selection of a control button can be detected. In this context, a control signal can be generated as a function of the operating mode which is assigned to the selected control button, and can be transmitted to a control device of the vehicle.

BRIEF DESCRIPTION OF THE DRAWINGS

Disclosed embodiments will now be explained with reference to the drawings, in which.

DETAILED DESCRIPTION

Figure 1:
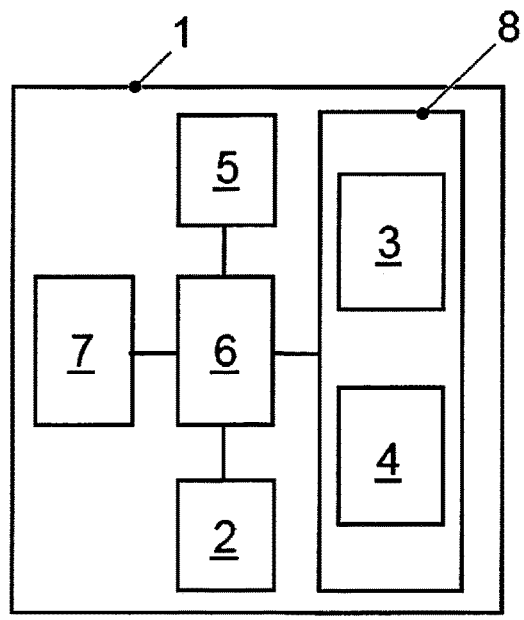
FIG. 1 shows an exemplary embodiment of the disclosed system.

Modern vehicles typically have a multiplicity of control systems by means of which various parameters of the vehicle operation are regulated and which often have a wide ranging influenced on the driving experience of the driver and the passengers of the vehicle. Settings of the chassis for the journey can be of central importance and, in addition to their significance for the safety they also influence the driving comfort.

For this reason, relevant settings can be increasingly also made and adapted by the user. However, the operator control of the systems which are used for the setting process frequently present users, in particular experienced users, with difficulties in terms of detecting the correct settings for the driving behavior of the vehicle which they desire. To overcome this, various approaches have been proposed.

In the system for manual setting of the shock absorption of a motor vehicle chassis which is described in DE 100 33 770 A1, a schematic illustration of a vehicle cross section and symbols are used to output the shock absorption on the basis of the active settings.

The method for activating and deactivating functions of a vehicle which is proposed in DE 10 2006 022 692 B4 provides that in an off-road operating mode of the vehicle a symbol display can light up which displays the off-road function.

The user interface which is described in EP 2 945 046 A1 permits a shock absorber of a vehicle to be set. For this purpose, control buttons are displayed, the activation of which can cause a menu to be called on the basis of which detailed settings can be made.

Finally, WO 2013/087777 A1 describes a method for setting vehicle functions in which driving functions can be set by activating control buttons.

Nevertheless, it becomes apparent that the known systems still require a large amount of experience and technical knowledge on the part of the user for their operation. Disclosed embodiments make available a method and a system for selecting an operating mode which make simple and intuitively comprehensible operator control possible for the user.

According to the disclosed embodiments, this is achieved by means of a method and a system.

The disclosed method of the type specified at the beginning is characterized in that the background display comprises a display of a vehicle surface, wherein the displayed vehicle surface is formed as a function of the operating mode selected at the current time.

This ensures that a user can very quickly and intuitively detect which operating mode is selected, and the consequences which the settings which are made will have for the driving behavior of the vehicle can be output very easily. In addition, the potential of high-quality display devices can be fully utilized, and an emotional impact can be used to permit the user to perform operator control without a long period of reflection and to give feedback about the selection made.

The operating modes can represent various driving profiles. For example, a driving profile which is optimized in economic and/or ecological terms can be provided. In addition, driving profiles can be optimized for a sporty or comfortable driving style or specific traffic conditions can be taken into account such as, for example, climatic conditions such as snowfall, moisture or specific roadway conditions such as in the case of off-road travel.

To improve the selection, in particular the background display of the user interface is formed in a particular way, by means of which user interface, in particular, a particularly strong and intuitively comprehensible connection can be established between the graphic user interface and the vehicle. This effect of the disclosed method is also assisted by the fact that the background display comprises a vehicle surface and therefore refers directly to the relationship with the vehicle. In this context, in particular differentiation is made between a bodywork shape which presents a geometric description of the profile of the external vehicle surface and the formation of the surface itself, which includes, for example, a configuration in terms of coloring and/or visual effects. The vehicle surface which is included in the background display is an abstract display of the actual external surface of the vehicle which is displayed in simplified form, wherein the similarity of the display to the real appearance can be expressed to a different degree depending on the degree of abstraction.

Control buttons are understood in the sense of the disclosed embodiments to be control elements of a graphic user interface. Control buttons differ from elements and areas for pure information display, referred to as display elements or display areas in that they can be selected and/or activated. When a control button is activated, an assigned function is carried out. The function can, for example, bring about a change in the information display. In addition, the control buttons can be used to control devices whose operator control is assisted by the information display. The control buttons can therefore replace conventional mechanical switches. They can be generated in any desired way for a freely programmable display area and displayed there, and in other scenarios they can be arranged at fixed positions, for example, when they are assigned to physical switching elements at these fixed positions.

The control buttons typically take up here a portion of the available area, while areas for the background display are available in their surroundings and/or between them. The background display is covered by the control buttons in the vicinity thereof, wherein the impression of spatial stacking is produced.

The graphic user interface can be output, for example, by means of a display which is fixedly arranged in the vehicle. For example, for this purpose a central display can be used such as is usually provided in many vehicles. The registering of the selection can also be made by means of this display, for example, by means of a touchscreen. However, other output devices can also be used, for example, another display of the vehicle or a display of a mobile user device which has an at least temporary data-transmitting connection to the vehicle.

The registration of user inputs, that is to say a selection or activation of control buttons, can also be carried out in various ways, wherein as an alternative to or in addition to a touchscreen, for example, a turn and push actuator, a touchpad, a keypad or a pushbutton switch can be used. For example, a selection can be made by touching a touchscreen at a position which is assigned to a specific control button. In addition, the selection can comprise shifting a pointer (cursor) to a specific position within the graphic user interface or changing a selection of control buttons, wherein the selection jumps from one control button to the next. The selection can be confirmed, for example, by pressing on a knob or pushbutton key.

The method permits the display of the control buttons and the background display to be formed in different ways. For example, the control buttons can have symbols, graphic representations or lettering, wherein the latter can be formed separately from the background display, in particular independently of the selected operating mode. In addition, the dynamic or static forms of display can be selected differently for the control buttons and the background display.

The selected operating mode can be activated on the basis of the control signal generated during the method, wherein, possibly, a confirmation operation can be provided to assume the selected operating mode. When an operating mode is activated, for example, predefined settings of specific devices for the vehicle are made.

According to at least one embodiment of the disclosed method, the display of the vehicle surface has a bodywork shape and display of virtual surroundings, wherein the display of the virtual surroundings is formed as a function of the operating mode selected at the current time and is displayed superimposed on the bodywork shape. As a result, a particularly direct connection between the user interface and the vehicle is achieved.

The bodywork shape is here a display of the geometric profile of the external vehicle surface, if appropriate with a specific degree of abstraction. For example, the profile of the surface can be displayed in a lateral region of the vehicle, wherein, in addition, the selection of the viewing angle and of the displayed portion is made in such a way that a particularly clearly discernible vehicle shape is generated.

The virtual surroundings can be displayed here in such a way that they appear on the displayed vehicle surface, for example, in the manner of a reflection. The term "virtual surroundings" is understood here to refer to a not necessarily realistic display of the surroundings of the vehicle. In this way it is possible to display that a driving situation in which the vehicle is located in surroundings of the type illustrated is assumed for the selected operating mode, and that the settings are selected in such a way that the driving behavior is adapted to the particular requirements of the respective driving situation.

The close relationship of the vehicle represented by the vehicle surface to its surroundings can be clarified by the superimposed display of the virtual surroundings, with the result that the user intuitively recognizes the close relationship between the surroundings and the driving behavior of the vehicle and selects optimum settings.

According to at least one disclosed embodiment, the bodywork shape of the background display is formed to be the same for all the operating modes. Since this element is displayed in such a way that it remains the same under the various conditions, the user of the user interface can easily recognize that adaptation of the properties of the respective same vehicle can be achieved for the changing properties of his surroundings by means of his settings. The display of the bodywork shape is independent of the selected operating mode here.

According to a further disclosed embodiment, the bodywork shape is displayed three-dimensionally. As a result the presence of the vehicle in specific surroundings can be well clarified.

According to at least one development, the virtual surroundings comprise a roadway, elements of traffic infrastructure and/or objects in the landscape. Therefore, relevant elements and properties of the surroundings of the vehicle can be represented by the virtual surroundings.

For example, a road can be displayed whose profile can, for example, have a large number of bends or be straight or which has traffic infrastructure such as, for example, specific roadway markings or road signs. In this way, a typical travel situation, which can be easily recognized again, can be represented, for example, on a freeway, a country road, a race track or away from tarmac roads. Objects in the landscape can represent here, in particular, topographic information, for example, particular geographic features such as, for example, mountains, or further properties of the surroundings, such as for example, trees.

According to at least one disclosed embodiment, surroundings data are collected and the background display is additionally formed as a function of the surroundings data. It is therefore possible to establish a relationship between the virtual and the actual surroundings of the vehicle.

For example, the surroundings data can be collected by means of a camera or other image-generating methods. In addition, further data can be collected, for example, by matching the position of the vehicle with a database, wherein data relating to roads and traffic conditions can be used, such as are typically used, for example, in navigation systems. It is therefore possible, for example, to determine on which type of road the vehicle is currently located and to adapt the display of the virtual surroundings correspondingly.

In addition, data can be used such as has also been collected for driver assistance systems. For example, data relating to traffic conditions in the actual surroundings of the vehicle can be included and the display of the virtual surroundings can be carried out in such a way that, for example, the surrounding traffic is represented.

For example, elements of the surrounding traffic and/or traffic infrastructure elements sensed in the surroundings of the vehicle, such as for example, road signs and roadway markings, the course of the roadway or elements in the landscape, can be integrated into the configuration of the background display, in particular of the virtual surroundings. The virtual surroundings can be formed as a display which is abstract to a certain extent of the actual surroundings of the vehicle.

According to a further disclosed embodiment, the collected surroundings data comprise weather data. Therefore, a particularly important parameter of the traffic conditions can be taken into account during the display of the virtual surroundings. For example, moisture or snow on a roadway or in the actual surroundings of the vehicle can be clarified on the basis of the virtual surroundings.

According to one development, an operating mode recommendation is generated on the basis of the collected surroundings data, wherein the operating mode recommendation is assigned an operating mode of the vehicle. As a result, the user can be assisted during the selection of the operating mode which is suitable for a driving situation. The operating mode recommendation can be output in various ways, for example, by marking of the control button which is assigned to the recommended operating mode, or by means of lettering.

There can be provision that an automatic selection of an operating mode is made on the basis of the operating mode recommendation. For example, an automatic pre-selection can already be made when a corresponding menu is called up.

According to at least one disclosed embodiment, the background display can be formed as a function of the operating mode recommendation. Therefore, the operating mode recommendation can be displayed in such a way that the recommended operating mode can be sensed particularly quickly and easily by the user. The recommended operating mode is already displayed as selected.

According to a further development, the background display also comprises lettering. As a result, an explicit designation of the active operating mode can be displayed. For example, the lettering can be displayed in such a way that it appears on a displayed area, for example, a roadway surface of the virtual surroundings.

According to one development, the background display also comprises further graphic elements, wherein the further graphic elements are formed as a function of the operating mode selected at the current time. This amounts to expanding the means which permit the virtual surroundings to be output.

The graphics elements can represent virtual objects which have a relationship with the display of the virtual surroundings. For example, if the virtual surroundings have specific climatic conditions, further information about the latter can be output by means of the further graphics elements, for example, by means of raindrops, by means of flying snow, or snow which is accumulated on the bodywork, by means of leaves which are flying around or by means of thrown up gravel.

According to at least one disclosed embodiment, the background display is generated dynamically. As a result, a particularly lively display is generated which permits the user to associate the user interface intensively with the displayed driving situation and the journey. For example, the dynamic generation of the background display can take place in such a way that a movement of the vehicle through the virtual surroundings is clarified. In addition, the further graphic elements can, for example, also be displayed while moving and phenomena of the virtual surroundings which are associated with the movement can be displayed.

According to a development, the control button of the graphic user interface which is selected at the current time is highlighted. This permits the selected operating mode to be made particularly clearly perceptible in a beneficial way.

The highlighting can take place here in a manner known per se, for example, by means of a change in size, a shadow or a further two-dimensional or three-dimensional effect, by means of a display which is changed in color, by means of a change in the brightness and/or by means of other highlighting effects which permit a differentiation from the other control buttons which are not assigned to selected operating modes. In addition, a change in the configuration of the control button can be used for the highlighting.

According to a further disclosed embodiment, a settings of a chassis, of a maximum speed, of a vehicle steering system and/or of a transmission controller are made on the basis of the control signal transmitted to the control device of the vehicle. As a result, parameters which are significant for the control of the driving style of the vehicle can be set very easily. Driving profiles can be predefined which comprise a set of settings to permit a user to make a setting with little effort.

The disclosed system of the type mentioned at the beginning is characterized in that the background display comprises a display of a vehicle surface, wherein the computing unit is configured to form the displayed vehicle surface as a function of the operating mode selected at the current time.

The disclosed system is designed to implement the disclosed method described above. The disclosed system therefore has the same benefits as the disclosed method.

An exemplary embodiment of the disclosed system will be explained with reference to FIG. 1.

A vehicle 1 comprises a control unit 6, to which a computing unit 2, a surroundings data-detection unit 7, a control device 5 and a touchscreen 8 are coupled. The touchscreen 8 comprises an output unit 3, in the exemplary embodiment illustrated a display 3, and a detection unit 4, in the case illustrated a touch-sensitive surface 4.

In this context, for example, a film can be arranged over a display surface of the display 3, with which film the position of contact of an activation object can be detected. An activation object may be the tip of a user's finger. The film can be embodied, for example, as a resistive touch film, capacitive touch film or piezoelectric film. In addition, the film can be embodied in such a way that a flow of heat, which starts, for example, from the tip of a user's finger, is measured. Various inputs can be acquired from the variation in the contact with the film over time. For example, in the simplest case the touching of the film at a specific position can be sensed and assigned to a graphic object displayed on the display 3. Furthermore, the duration of the contact at a specific position or within a specific region can be sensed. In addition, gestures, for example, a wiping gesture during which the position of contact with the touch-sensitive surface 4 from a starting position to an end position changes and describes a specific path in the process can be defined for operator control.

Figure 2:
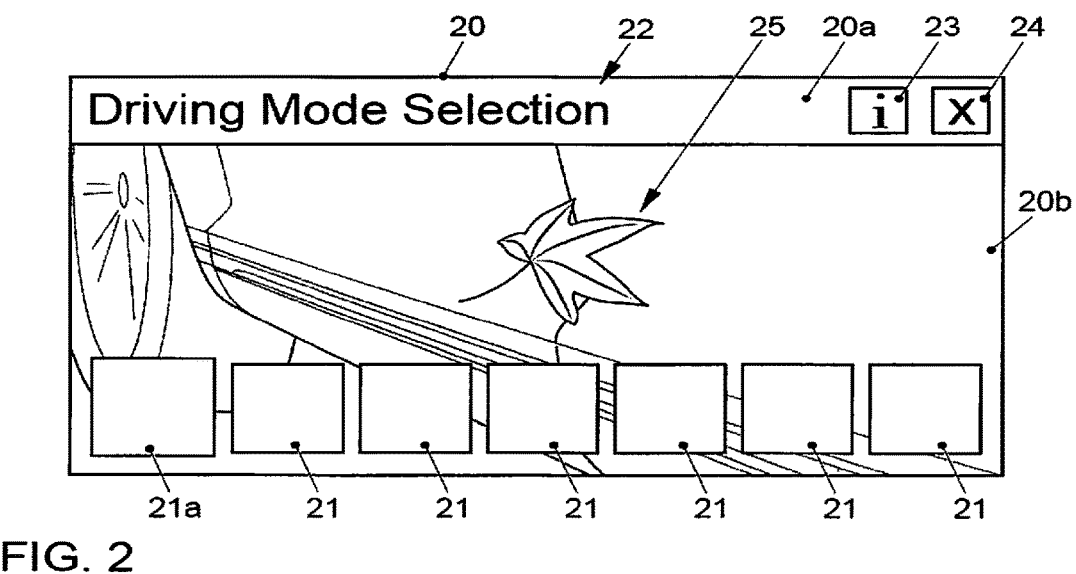
FIG. 2 shows an exemplary embodiment of a user interface generated by means of the disclosed method.

An exemplary embodiment of the disclosed method will be explained with reference to FIGS. 1 and 2. In this context, the exemplary embodiment of the disclosed system explained above with respect to FIG. 1 is taken as a basis.

Graphics data of a graphic user interface 20 are generated by the computing unit 2. The graphics data is transmitted to the touchscreen 8 and displayed by means of a display surface of the display 3. The graphic user interface 20 which is illustrated in FIG. 2 comprises two regions, specifically an information bar 20a which extends over the entire width at the upper edge of the graphic user interface 20 and an information text 22 as well as "information" 23 and "close" 24 control buttons.

The remaining surface of the graphic user interface 20 takes up a background display 20b. Control buttons 21, 21a are illustrated in the foreground, partially overlapping the background display 20b. The control buttons 21, 21a are each assigned an operating mode of the vehicle 1, and the control buttons 21, 21a have symbols and/or lettering for identifying the operating modes assigned to the control buttons 21, 21a. The term "operating mode" is used here to refer to a predefined combination of specific settings of the vehicle 1, for example, for a specific driving profile. In this context the chassis of the vehicle 1 is set. In addition, further parameters can be set which are relevant for the control of the vehicle 1 and for the driving behavior and the driving experience.

An operating mode of the vehicle 1 can be selected by means of the graphic user interface 20, wherein the selected operating mode for the vehicle 1 can be assumed directly. In further exemplary embodiments it is possible to provide that the operating mode is not assumed, and the settings assigned to it not performed at the corresponding devices of the vehicle 1 until after the selection has been confirmed in a further operation.

In the illustrated exemplary embodiment, a control button 21a is highlighted as selected, represented in this example by a larger area compared with the control buttons 21 which are not selected. In further exemplary embodiments, further graphic highlighting can be provided alternatively or additionally, for example, by means of a change in the color, brightness, shape or by means of a dynamic graphic effect.

The control buttons 21, 21a, 23 and 24 of the graphic user interface 20 are embodied as control elements. They permit operator control by the user in combination with the touch-sensitive surface 4 of the touchscreen 8. This takes place in the exemplary embodiment by touching the control buttons, wherein the position of the contact is detected by the touch-sensitive surface 4, and the position is assigned to a specific function and a control signal is generated on the basis of the function. For example, a window with an information text, for example, with more wide ranging information about the available functions, can be called up in a manner known per se by touching the "information" 23 control button. In addition, the window which is currently open, the name of which is output by the information text 22 as "driving mode selection" can be closed by touching the "close" 24 control button. In addition, the respectively assigned operating mode can be selected by touching one of the non-selected control buttons 21. If a new operating mode is selected by touching a control button 21 which has not been selected beforehand, the corresponding control button is now displayed as a selected control button 21a, while the previously selected control button is no longer displayed highlighted as the non-selected control button 21.

The background display 20b comprises a representation of a detail of an abstract vehicle, wherein in particular a vehicle surface is displayed. In addition, further elements of the vehicle, in particular wheels, can be displayed. The background display 20b also comprises a graphic object 25 which is also dynamically displayed in the exemplary embodiment. The vehicle surface has a bodywork shape which is displayed in the same way for all the operating modes of the vehicle 1 in the exemplary embodiment. In addition to this, the background display 20b is formed by means of further elements of the display as a function of the respectively selected operating mode. Details of this are explained below.

In the exemplary embodiment there is also provision that data relating to the surroundings of the vehicle 1 are collected by means of the surroundings data collection unit 7. A camera is provided, by means of which information about further road users, of the profile of the roadway, the condition of the roadway, climatic conditions and/or light conditions are collected. The background display 20b is also formed in the exemplary embodiment on the basis of this surroundings data. The background display 20b reflects the actual conditions of the surroundings of the vehicle 1, wherein abstraction can be carried out, in particular to simplify the displayed scene.

In addition, an operating mode recommendation is generated as a function of the surroundings data. This operating mode recommendation comprises information on the operating mode which is considered to be particularly suitable for the conditions in the surroundings of the vehicle 1. The background display 20b is formed as a function of the operating mode recommendation in the example. The recommended operating mode is displayed as selected at the start of the selection possibility, wherein the corresponding selected control button 21a is displayed as highlighted. In addition, in a further exemplary embodiment the operating mode recommendation can be assumed automatically.

After the selection of an operating mode by actuating the respectively assigned control button 21, 21a, the control unit 6 generates a control signal and transmits it to the control device 5, in the illustrated case a driving profile controller 5. The latter applies the corresponding settings for further devices of the vehicle 1. In this context, in a further exemplary embodiment a confirmation operation can be provided, for example, in that the user has to confirm his selection before the operating mode is changed.

With reference to FIGS. 3A to 3G, further exemplary embodiments of user interfaces which are generated by means of the disclosed method are explained. In this context, the disclosed system as described above continues to be taken as the starting point.

Seven driving profiles of which each corresponds to an operating mode are provided in each of the exemplary embodiments. These profiles are referred to as "eco", "comfort", "normal", "sporty", "individual", "off-road" and "snow". Each of the seven operating modes is assigned one of the control buttons 21, 21a. In the example illustrated in FIG. 3A, the driving profile "snow" is selected and the corresponding control button 21a is represented in highlighted form.

The background display 20b comprises a display of a lateral detail of the vehicle during travel under winter conditions. This is displayed by snow 25a which is accumulated on the bodywork and by thrown up water droplets in the lower region of the background display 20*b*. In this context, a dynamic effect is displayed, for example, the displayed water droplets move. In addition, superimposition of the vehicle surface by a display of virtual surroundings is generated, wherein the virtual surroundings are depicted with a reflection on the vehicle surface. In the illustrated case, a road with snow is displayed here in a snowy mountain landscape.

Figure 3A:
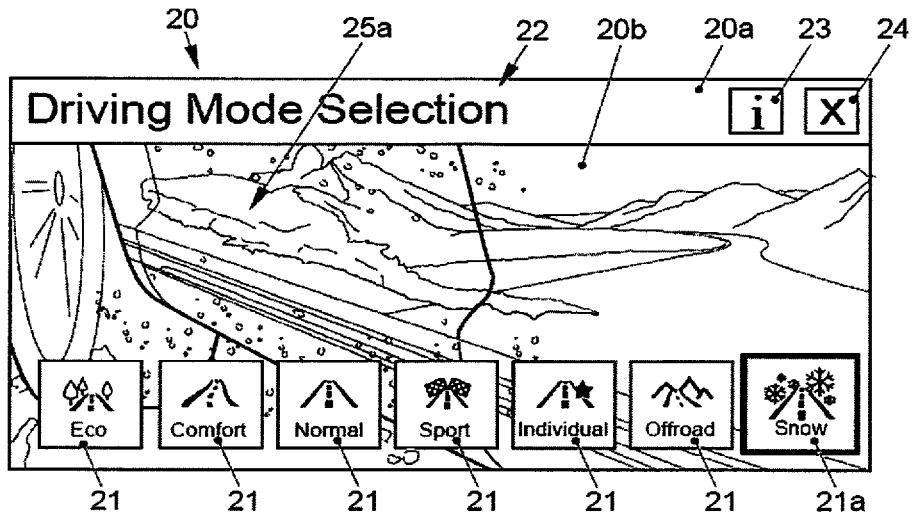
FIGS. 3A to 3G show further exemplary embodiments of user interfaces which are generated by means of the disclosed method.
Figure 3B:
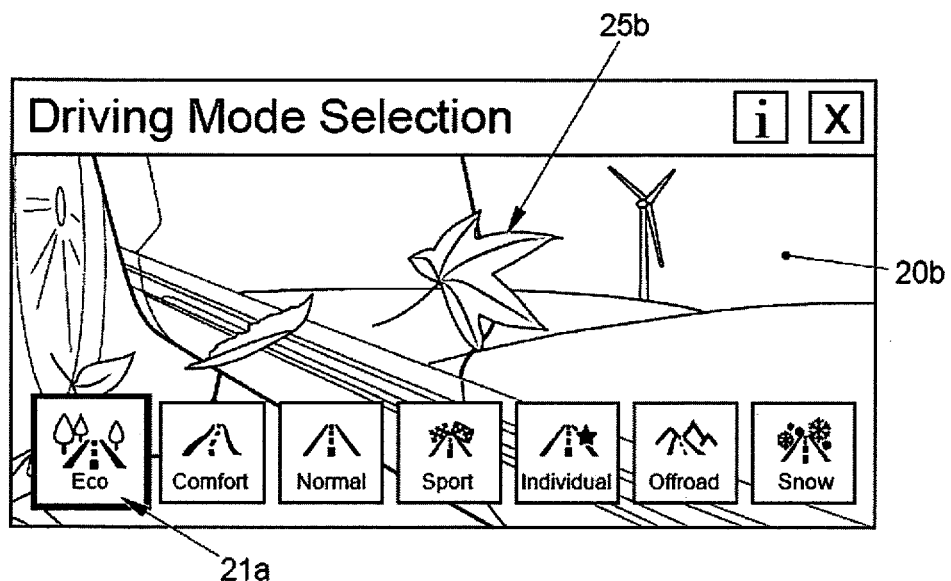

In the case illustrated in FIG. 3B, the "eco" driving profile is selected. The corresponding control button 21*a* is displayed in highlighted form. The background display 20*b* comprises the same bodywork shape as has already been described above with respect to FIG. 3A. In addition, a reference to the driving profile is intended to permit particularly efficient and eco-friendly driving is established by particular virtual surroundings. Landscape which is displayed as virtual surroundings reflected onto the surface of the bodywork shape comprises green hills and a windmill. In addition, the background display 20*b* comprises a leaf 25*b* flying through the air in the region of the bodywork.

Figure 3C:
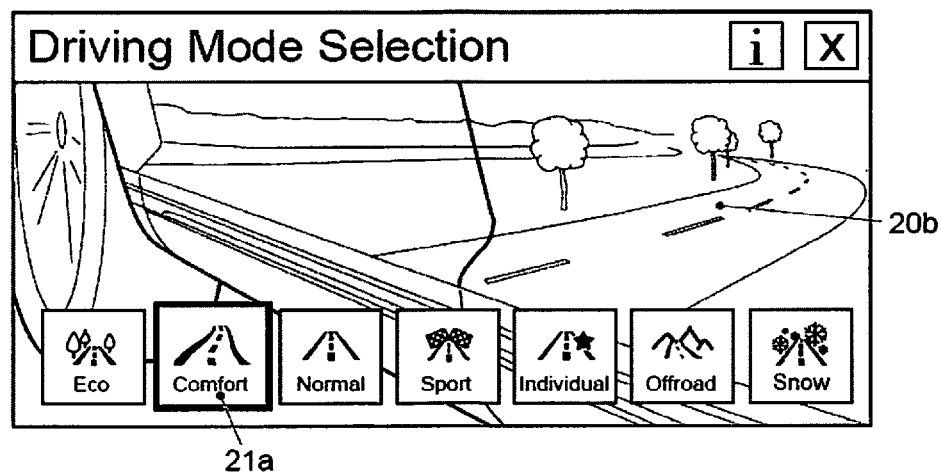

In the case illustrated in FIG. 3C, the "comfort" driving profile is selected and the corresponding control button 21*a* is displayed in highlighted form. The virtual surroundings which are displayed as reflected in the bodywork shape in the case of the background display 20*b* comprise a slightly curving roadway profile in a green landscape.

Figure 3D:
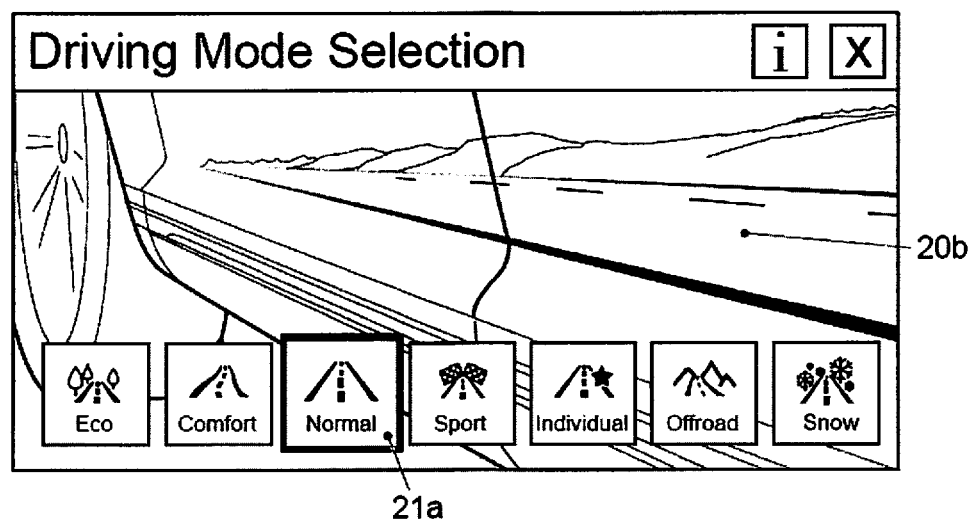

In the case illustrated in FIG. 3D, the "normal" driving profile is selected and the corresponding control button 21*a* is displayed in highlighted form. The virtual surroundings of the background display 20*b* comprise a straight profile of a road in a landscape which is displayed in largely neutral way.

Figure 3E:
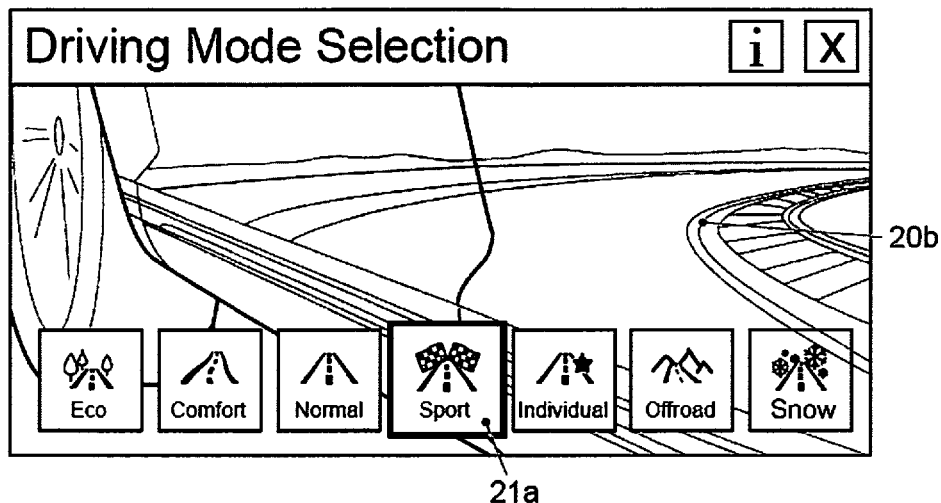

In the case illustrated in FIG. 3E, the "sporty" driving profile is selected and the corresponding control button 21*a* is displayed in highlighted form. The background display 20*b* comprises again the same bodywork shape as in the cases described above, and in this case the virtual surroundings reflected on the vehicle surface comprise a detail of a race track with a curved profile and with characteristic markings at the edge of the roadway.

Figure 3F:
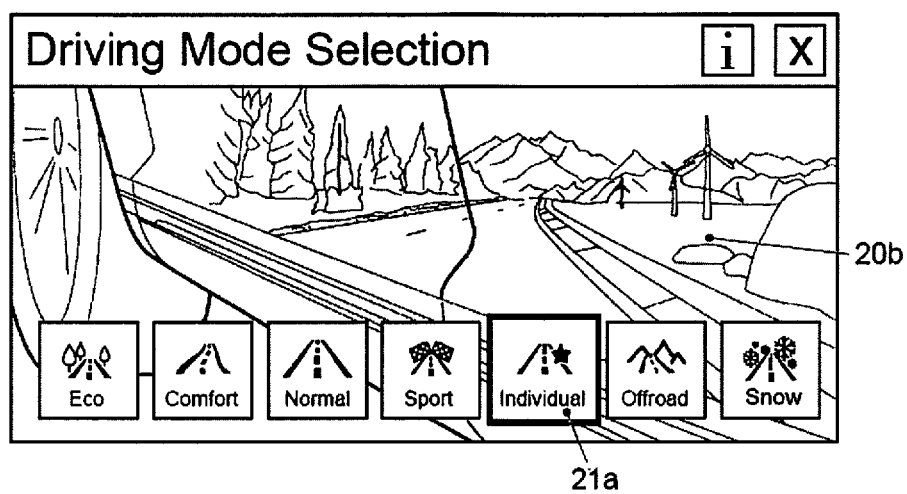

In the case illustrated in FIG. 3F, the "individual" driving profile is selected and the corresponding control button 21*a* is displayed in highlighted form. The background display 20*b* comprises again the same bodywork shape as illustrated above and the virtual surroundings displayed as being reflected on the surface of the bodywork shape comprise a mixture of various elements, in particular a partially snowy landscape with mountains and green meadows and hills, windmills, a roadway with a partially smooth and partially uneven roadway covering and roadway boundaries which are typical of race tracks.

Figure 3G:
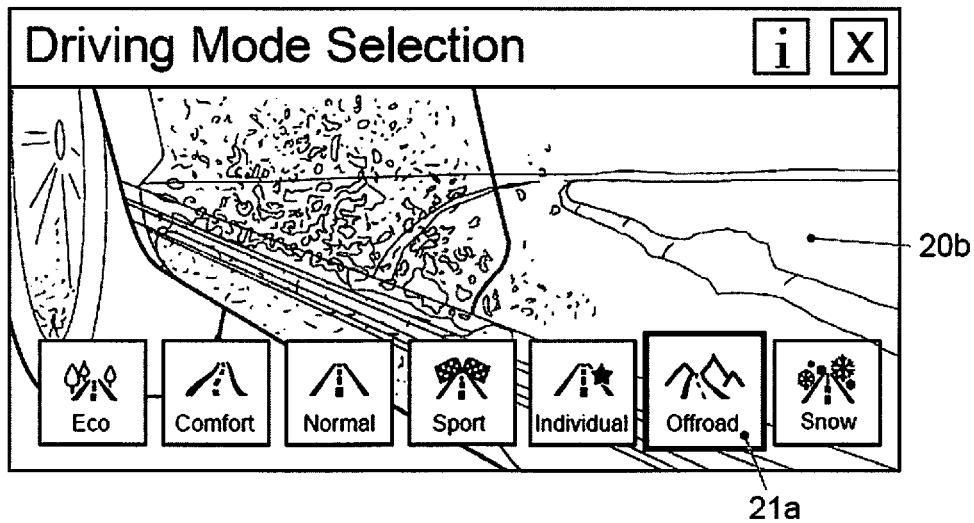

In the case illustrated in FIG. 3G, the "off-road" driving profile is selected and the corresponding control button 21*a* is displayed in highlighted form. The background display 20*b* comprises again the same bodywork shape as already displayed above, but the virtual surroundings which are displayed reflected on the surface of the bodywork shape comprise a non-tarmac roadway in a rocky landscape. In addition, splashes of mud and thrown up particles of dirt are displayed on the surface of the bodywork.

Figure 4A:
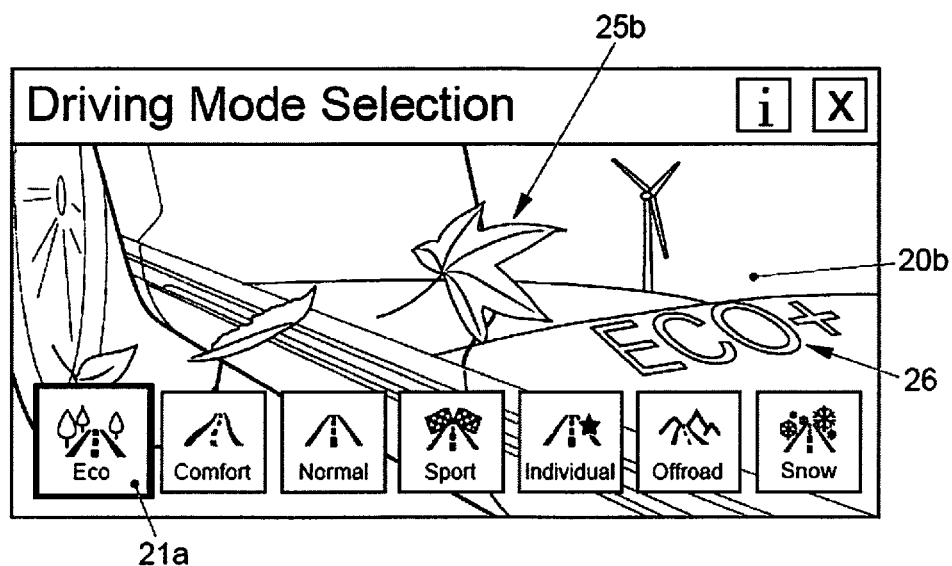
FIGS. 4A and 4B show exemplary embodiments of user interfaces which are generated by means of the disclosed method and have lettering.
Figure 4B:
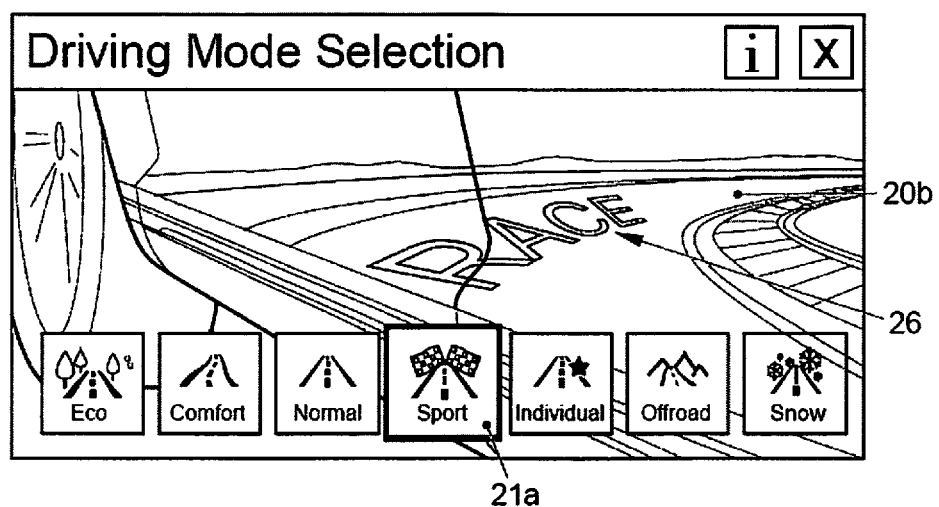

With reference to FIGS. 4A and 4B, exemplary embodiments of user interfaces which are generated by means of the disclosed method and have lettering are explained. In this context, the disclosed system and method as explained above and user interfaces displayed in FIGS. 3A to 3G are taken as the basis.

In the case illustrated in FIG. 4A, the "eco" driving profile is selected and the corresponding control button 21*a* is displayed in highlighted form. The background display 20*b* comprises, similarly to the case explained above with respect to FIG. 3B, the same bodywork shape as in the cases described above and virtual surroundings which are displayed as a reflection on the surface of the bodywork shape. The virtual surroundings comprise a windmill and green hills. In addition, a leaf 25*b*, which flies through the air in the region of the bodywork, is displayed as a further graphic object. The background display 20*b* also comprises lettering 26 which reads "ECO+" here. The lettering 26 is displayed in such a way that it appears to be located on the surface of one of the green hills of the virtual surroundings.

Analogously, in the case illustrated in FIG. 4B the background display 20*b* comprises the "RACE" lettering 26, wherein this lettering is displayed in such a way that it appears to be located on a roadway of a race track and follows the profile of a curve. The background display 20*b*, in particular the bodywork shape and virtual surroundings, otherwise correspond essentially to the graphic user interface 20 illustrated in FIG. 3E.

In further exemplary embodiments, other forms of display for the background display 20*b* are selected. The displayed bodywork shape can be abstracted to a greater or lesser degree. In this context, a specific bodywork shape of the vehicle 1 or a typical bodywork shape for a vehicle of a similar class can be displayed. The virtual surroundings which are displayed as being reflected on the surface of the bodywork shape can also be formed in various ways, in particular as a function of the available vehicle operating modes of the vehicle 1. In addition, alternatively or additionally further graphic objects 25 can be displayed which signal that the displayed vehicle is located in the virtual surroundings. It is to be noted here that the displayed virtual surroundings relate to the respectively selected operating mode.

LIST OF REFERENCE NUMBERS

1 Vehicle
2 Computing unit
3 Output unit; display
4 Collection unit; touch-sensitive surface
5 Control device; driving profile controller
6 Control unit
7 Surroundings data collection unit
8 Touchscreen
20 Graphic user interface
20*a* Information bar
20*b* Background display
21 Control button (not selected)
21*a* Control button (selected)
22 Information text
23 "Information" control button
24 "Close" control button
25 Graphic object
25*a* Snow
25*b* Leaf
26 Lettering

The invention claimed is:

1. A method for selecting an operating mode for a vehicle which has at least two operating modes, the method comprising:

generating and outputting graphics data of a graphic user interface, wherein the graphic user interface comprises a background display and at least two selectable control buttons, wherein the control buttons are each assigned to an operating mode of the vehicle, and each control button includes a graphic image;

detecting a selection of a control button;

generating and transmitting to a control device of the vehicle a control signal as a function of the operating mode assigned to the selected control button; and displaying, as the background display, a depiction of roadway surface which the vehicle occupies and a display of virtual surroundings apart from the roadway surface which the vehicle occupies including at least one aspect of landscape objects formed as a function of the presently selected operating mode, wherein the graphic image of each control button corresponds with the virtual surroundings for the operating mode to which the respective control button is assigned.

2. The method of claim 1, wherein displaying a depiction of the roadway surface which the vehicle occupies comprises display of a vehicle surface including a bodywork shape and the display of virtual surroundings; wherein the display of the virtual surroundings is superimposed on the bodywork shape.

3. The method of claim 2, wherein the bodywork shape of the background display is formed to be the same for all the operating modes.

4. The method of claim 2, wherein the bodywork shape is displayed three-dimensionally.

5. The method of claim 2, wherein the virtual surroundings comprise at least one of a roadway and elements of traffic infrastructure.

6. The method of claim 1, wherein surroundings data are collected and the background display is additionally formed as a function of the surroundings data.

7. The method of claim 6, wherein the collected surroundings data comprise weather data.

8. The method of claim 6, wherein an operating mode recommendation is generated based on the collected surroundings data, wherein the operating mode recommendation is assigned an operating mode of the vehicle.

9. The method of claim 8, wherein the background display is formed as a function of the operating mode recommendation.

10. The method of claim 1, wherein the background display also comprises lettering.

11. The method of claim 1, wherein the background display additionally comprises further graphic elements, wherein the further graphic elements are formed as a function of the operating mode selected at the current time.

12. The method of claim 1, wherein the background display is generated dynamically.

13. The method of claim 1, wherein the control button of the graphic user interface selected at the current time is highlighted.

14. The method of claim 1, wherein settings of a chassis of a maximum speed of at least one of a vehicle steering system and a transmission controller are made based on the control signal transmitted to the control device of the vehicle.

15. A system for selecting an operating mode for a vehicle, the system comprising at least two operating modes, having a computing unit by which graphics data of a graphic user interface is generated; and an output unit by which the graphics data is output;

wherein the graphic user interface comprises a background display and at least two selectable control buttons, wherein the control buttons are each assigned to an operating mode of the vehicle and each include a graphic image; and a detection unit by which a selection of a control button is detected;

wherein a control signal is generated as a function of the operating mode assigned to the selected control button, and is transmitted to a control device of the vehicle;

wherein the background display comprises a depiction of roadway surface which the vehicle occupies and a display of virtual surroundings apart from the roadway surface which the vehicle occupies including at least one landscape object formed as a function of the operating mode selected at the current time, wherein the graphic image of each control button corresponds with the virtual surroundings for the operating mode to which the respective control button is assigned.

16. The system of claim 15, wherein the virtual surroundings comprise at least one of another section of roadway and elements of traffic infrastructure apart from the roadway surface which the vehicle occupies.

17. The system of claim 15, wherein displaying a depiction of the roadway surface which the vehicle occupies comprises display of a vehicle surface includes a bodywork shape and the display of virtual surroundings; wherein the display of the virtual surroundings is superimposed on the bodywork shape.

18. The system of claim 15, wherein surroundings data are collected and the background display is additionally formed as a function of the surroundings data.

19. The system of claim 18, wherein the collected surroundings data comprise weather data.

20. The system of claim 18, wherein an operating mode recommendation is generated based on the collected surroundings data.

* * * * *